United States Patent
Hamachi et al.

(10) Patent No.: US 9,056,407 B2
(45) Date of Patent: Jun. 16, 2015

(54) METHOD OF AND APPARATUS FOR MOLDING GLAZING GASKET ONTO MULTILAYER GLASS PANEL

(75) Inventors: Yousuke Hamachi, Hiratsuka (JP); Shuichi Toriumi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 779 days.

(21) Appl. No.: 13/377,025

(22) PCT Filed: Jun. 9, 2009

(86) PCT No.: PCT/JP2009/060820
§ 371 (c)(1),
(2), (4) Date: Jan. 11, 2012

(87) PCT Pub. No.: WO2010/143310
PCT Pub. Date: Dec. 16, 2010

(65) Prior Publication Data
US 2012/0096899 A1 Apr. 26, 2012

(51) Int. Cl.
*E06B 3/673* (2006.01)
*B29C 47/02* (2006.01)
*B29C 47/08* (2006.01)
*B29C 47/00* (2006.01)

(52) U.S. Cl.
CPC ........... *B29C 47/026* (2013.01); *B29C 47/0866* (2013.01); *B29C 47/003* (2013.01); *B29C 47/0035* (2013.01)

(58) Field of Classification Search
CPC  B29C 47/026; B29C 47/003; B29C 47/0035; B29C 47/065; B29C 47/0864; B29C 47/0866; B25J 9/026; E06B 3/6733; E06B 3/67347; E06B 3/67391; E06B 3/67373; E06B 3/67343

USPC ........ 264/45.9, 46.4, 171.11, 173.12, 173.16, 264/177.1, 260, 134, 135; 414/769, 768, 414/762, 771
See application file for complete search history.

(56) References Cited

U.S. PATENT DOCUMENTS 3,948,385 A * 4/1976 Shinomiya ..................... 198/403
5,142,211 A * 8/1992 Tan ............................. 318/568.1
(Continued)

FOREIGN PATENT DOCUMENTS

JP          7291678      11/1995
JP          2009154526   7/2009

OTHER PUBLICATIONS

PCT application PCT/JP2009/060820; filed Jun. 9, 2009; Hamachi, Yousuke; International Search Report mailed Sep. 8, 2009.

*Primary Examiner* — Joseph S Del Sole
*Assistant Examiner* — Lawrence D Hohenbrink, Jr.
(74) *Attorney, Agent, or Firm* — Thorpe North & Western

(57) ABSTRACT

While a first coating gun 405 is being moved along a peripheral edge portion 100*a* of one surface of a multilayer glass panel 100 horizontally placed on a first worktable 20, the first coating gun 405 discharges a molding material to coat the peripheral edge portion 100*a* with the molding material over its entire length, molding a glazing gasket 110 thereon. An inverting mechanism 60 inverts the multilayer glass panel 100 with the molded glazing gasket 110 such that the other surface of the multilayer glass panel 100 faces upwardly. Then, a second coating gun 505 is moved along a peripheral edge portion 100*b* of the other surface of the multilayer glass panel 100, which is horizontally placed on a second worktable 30, and simultaneously discharges a molding material to coat the peripheral edge portion 100*b* with the molding material over its entire length, molding a glazing gasket 110 thereon.

14 Claims, 10 Drawing Sheets

(56) References Cited

U.S. PATENT DOCUMENTS

| | | |
|---|---|---|
| 5,273,704 A | 12/1993 | Scholl et al. |
| 5,336,349 A | 8/1994 | Cornils et al. |
| 5,554,325 A * | 9/1996 | Kotte et al. ............... 264/37.26 |
| 7,819,999 B2 | 10/2010 | Watanabe et al. |
| 2006/0151089 A1* | 7/2006 | Kawamori .................... 156/109 |
| 2008/0115451 A1* | 5/2008 | Watanabe et al. .......... 52/745.19 |

* cited by examiner

METHOD OF AND APPARATUS FOR MOLDING GLAZING GASKET ONTO MULTILAYER GLASS PANEL

TECHNICAL FIELD

The present invention relates to a method of and an apparatus for molding a glazing gasket onto a multilayer glass panel, and more particularly to a method of and an apparatus for molding a glazing gasket onto a multilayer glass panel by directly coating the multilayer glass panel with a molding material such as a highly viscous thermoplastic elastomer.

BACKGROUND ART

Generally, multilayer glass panels comprise two glass panes and a spacer interposed between the two glass panes to provide an air layer therebetween. Since the multilayer glass panels thus constructed have an excellent thermal insulation capability, they serve as an energy saver when used in combination with housing and building sashes.

Glazing gaskets for use on most typical multilayer glass panels that have heretofore been available are of a continuous channel-shaped extruded structure which comprises a rubber layer adapted to project from a sash groove and a resin layer adapted to be inserted in the sash groove, the rubber layer and the resin layer being joined to each other. A continuous glazing gasket is cut into lengths that match the vertical and horizontal dimensions of a multilayer glass panel. The glazing gasket lengths are then fitted over the vertical and horizontal edges of the multilayer glass panel, and the vertical and horizontal edges of the multilayer glass panel which are covered with the glazing gasket lengths are inserted into the corresponding grooves of a sash. In this manner, the multilayer glass panel is installed in the sash.

The above process of mounting the glazing gasket on the multilayer glass panel is tedious and time-consuming and is of low productivity because the glazing gasket is manually fitted over the edges of the multilayer glass panel.

For increased productivity, there has recently been proposed a method of molding a glazing gasket onto a multilayer glass panel by extruding a molding material directly onto the peripheral edges of the multilayer glass panel with molding dies which are connected to an extruding machine and shot pumps, as disclosed in WO2006/046349.

The proposed method will be described below with reference to FIG. 12 of the accompanying drawings.

First, a multilayer glass panel 1, with its plane oriented vertically, is placed on and held by a worktable 2. Then, a pair of molding dies 3a, 3b is pressed against the respective face and back surfaces of a peripheral edge of the multilayer glass panel 1.

The molding dies 3a, 3b are connected to a molding material shot pump, not shown, and an adhesive shot pump, not shown. A predetermined amount of melted molding material is supplied from an extruding machine, not shown, to the molding material shot pump, and temporarily stored in the molding material shot pump. At the same time, a predetermined amount of a melted hot-melt adhesive is supplied from an adhesive supply pump, not shown, to the adhesive shot pump, and temporarily stored in the adhesive supply pump. Thereafter, the adhesive supply pump supplies the melted hot-melt adhesive under pressure to the molding dies 3a, 3b, which discharge the melted hot-melt adhesive onto the face and back surfaces of the peripheral edge of the multilayer glass panel 1, thereby coating the face and back surfaces of the peripheral edge of the multilayer glass panel 1 with respective layers 4 of the melted hot-melt adhesive. At the same time, the molding material shot pump supplies the melted molding material under pressure to the molding dies 3a, 3b, which discharge the melted molding material 5 onto the layers 4 of the melted hot-melt adhesive, forming respective layers 5 of the melted molding material thereon.

One or both of the molding dies 3a, 3b and the multilayer glass panel 1 are moved relatively to each other by a feed mechanism, not shown, so that the molding dies 3a, 3b are continuously displaced along the peripheral edge of the multilayer glass panel 1. The layers 4 of the melted hot-melt adhesive and the layers 5 of the melted molding material are thus continuously applied to the face and back surfaces of the peripheral edge of the multilayer glass panel 1, forming glazing gaskets 6 thereon.

DISCLOSURE OF THE INVENTION

Problems to be Solved by the Invention

According to the proposed method of molding a glazing gasket onto a multilayer glass panel, the multilayer glass panel is vertically placed in an upstanding position on the worktable. If the multilayer glass panel is of a size of 2400 mm×1500 mm or greater, then the multilayer glass panel erected on the worktable tends to flex greatly. When the multilayer glass panel flexes while the adhesive and the molding material are being applied as continuous layers to the peripheral edge of the multilayer glass panel, the molding dies fail to follow the flexure of the multilayer glass panel. As a result, the applied layers of the molding material may not be properly bonded to the multilayer glass panel, and may have thickness irregularities. If these difficulties arise, then the glazing gasket is not molded to a nicety on the multilayer glass panel.

In addition, a large-size support mechanism is required to hold the molding dies perpendicularly to the vertical plane of the multilayer glass panel. The support mechanism is also heavy because it includes actuators for moving the molding dies toward and away from the vertical surfaces of the multilayer glass panel and actuators for turning the molding dies about axes that are perpendicular to the vertical plane of the multilayer glass panel.

For the above reasons, the proposed method makes it impossible to coat the multilayer glass panel with the adhesive and the molding material at a high rate such as of 400 mm/sec. If an attempt is made to coat the multilayer glass panel with the adhesive and the molding material at such a high rate, then the adhesive and the molding material will not be applied as highly accurate layers, resulting in defective products.

Multilayer glass panels are available in a wide range of different sizes which differ by the unit of 1 mm. If the surfaces of multilayer glass panels which are to be coated with the adhesive and the molding material are to be accurately positioned by suction cups, then many suction cups of different sizes and different setup schemes for those suction cups are required to handle multilayer glass panels of different sizes.

It is an object of the present invention to provide a method of and an apparatus for molding a glazing gasket onto a multilayer glass panel automatically by coating the multilayer glass panel with a molding material at a high speed and with high accuracy without adhesive bonding failures.

Means for Solving the Problems

According to an aspect of the present invention, there is provided a method of molding a glazing gasket onto a multilayer glass panel by applying a molding material to a peripheral edge portion of the multilayer glass panel, comprising the steps of placing the multilayer glass panel on a first worktable with one surface of the multilayer glass panel facing upwardly, moving a first coating gun along a peripheral edge portion of the one surface of the multilayer glass panel on the first worktable and discharging the molding material from the first coating gun to coat the peripheral edge portion over an entire length thereof with the molding material for thereby molding a glazing gasket on the peripheral edge portion of the one surface of the multilayer glass panel, inverting the multilayer glass panel with the glazing gasket molded thereon by the first coating gun such that another surface of the multilayer glass panel which is free of the glazing gasket faces upwardly, placing the inverted multilayer glass panel on a second work-table with the other surface of the multilayer glass panel facing upwardly, and moving a second coating gun along a peripheral edge portion of the other surface of the multilayer glass panel on the second worktable and discharging the molding material from the second coating gun to coat the peripheral edge portion over an entire length thereof with the molding material for thereby molding a glazing gasket on the peripheral edge portion of the other surface of the multilayer glass panel.

According to another aspect of the present invention, there is provided an apparatus for molding a glazing gasket onto a multilayer glass panel by applying a molding material to a peripheral edge portion of the multilayer glass panel, comprising a first worktable for placing thereon the multilayer glass panel with one surface of the multilayer glass panel facing upwardly, a second worktable for placing thereon the multilayer glass panel with another surface of the multilayer glass panel facing upwardly, a first coating mechanism for coating a peripheral edge portion of the one surface of the multilayer glass panel on the first worktable with a molding material for thereby molding a glazing gasket on the peripheral edge portion of the one surface of the multilayer glass panel, a feed mechanism for feeding the multilayer glass panel with the glazing gasket molded thereon by the first coating mechanism from the first worktable, inverting the multilayer glass panel such that the other surface of the multilayer glass panel which is free of the glazing gasket faces upwardly, and placing the inverted multilayer glass panel on a second worktable, and a second coating mechanism for coating a peripheral edge portion of the other surface of the multilayer glass panel on the second worktable with a molding material for thereby molding a glazing gasket on the peripheral edge portion of the other surface of the multilayer glass panel.

According to still another aspect of the present invention, there is provided a molding die for molding a glazing gasket onto a glass panel by applying a molding material to a surface of the glass panel which is horizontally placed while horizontally moving with respect to the glass panel, comprising a bottom surface for facing the surface of the glass panel, a side surface having a height rising from the bottom surface and a width perpendicular to the height, a molding material supply passage, and an extrusion port connected to the molding material supply passage, the extrusion port including a first opening extending in a widthwise direction of the side surface and being open in a portion of the side surface which is spaced from the bottom surface, and a second opening having a length in the widthwise direction of the side surface, which is smaller than the length of the first opening, and being open in the side surface and the bottom surface such that a portion of the molding material supply passage near the first opening is open in respective portions of the side surface and the bottom surface beneath the first opening.

According to yet another aspect of the present invention, there is provided a method of molding a glazing gasket onto a glass panel by applying a molding material to a surface of the glass panel which is horizontally placed while horizontally moving with respect to the glass panel, the glazing gasket including a base extending horizontally, a protrusion joined to the base and projecting upwardly away from the glass panel, and a lower strip extending along the base and projecting downwardly toward the glass panel from a transversely central portion of the base, the method comprising the steps of providing a molding die for molding the glazing gasket, the molding die having a molding material supply passage for supplying the molding material therethrough and an extrusion port connected to the molding material supply passage, the molding die including a bottom surface for facing the surface of the glass panel and a side surface having a height rising from the bottom surface and a width perpendicular to the height, the extrusion port including a first opening extending in a widthwise direction of the side surface and being open in a portion of the side surface which is spaced from the bottom surface, and a second opening having a length in the widthwise direction of the side surface, which is smaller than the length of the first opening, and being open in the side surface and the bottom surface such that a portion of the molding material supply passage near the first opening is open in respective portions of the side surface and the bottom surface beneath the first opening, horizontally moving the molding die over the surface of the glass panel, extruding the molding material from the first opening onto the surface of the glass panel in a first obliquely downward direction, and simultaneously extruding the molding material from the second opening onto the surface of the glass panel in a second obliquely downward direction which is inclined more downwardly than the first obliquely downward direction, while the molding die is being horizontally moved over the surface of the glass panel.

With the method of and the apparatus for molding a glazing gasket onto a glass panel according to the present invention, the first coating gun is moved along the peripheral edge portion of one of the surfaces of the multilayer glass panel which is horizontally placed on the first worktable with the one of the surfaces thereof facing upwardly, and simultaneously applies the molding material to coat the entire length of the peripheral edge portion with the molding material, molding the glazing gasket on the peripheral edge portion of the one of the surfaces of the multilayer glass panel. Then, the multilayer glass panel with the glazing gasket molded thereon is inverted by the inverting mechanism such that the other surface of the multilayer glass panel faces upwardly, and then is horizontally placed on the second worktable. The second coating gun is moved along the peripheral edge portion of the other surface of the multilayer glass panel on the second worktable, and simultaneously applies the molding material to coat the entire length of the peripheral edge portion with the molding material, molding the glazing gasket on the peripheral edge portion of the other surface of the multilayer glass panel.

According to the present invention, the glazing gasket can automatically be molded on the multilayer glass panel by applying the molding material thereto. The molding material can be applied to the multilayer glass panel at a high rate of 400 mm/sec, for example, without the possibility of adhesive bonding failures.

With the molding die for molding a glazing gasket and the method of molding a glazing gasket using the molding die, even when the coating gun is moved at a high speed over the glass panel, the glazing gasket is securely bonded to the surface of the glass panel against the possibility of being unduly lifted off.

BEST MODE FOR CARRYING OUT THE INVENTION

A glazing gasket molding apparatus according to an embodiment of the present invention, which carries out a method of molding a glazing gasket onto a multilayer glass panel according to the present invention, will be described in detail below with reference to the drawings. The principles of the present invention should not be construed as being limited to the glazing gasket molding apparatus and the method carried out thereby which are illustrated in the embodiment of the present invention.

Figure 1:
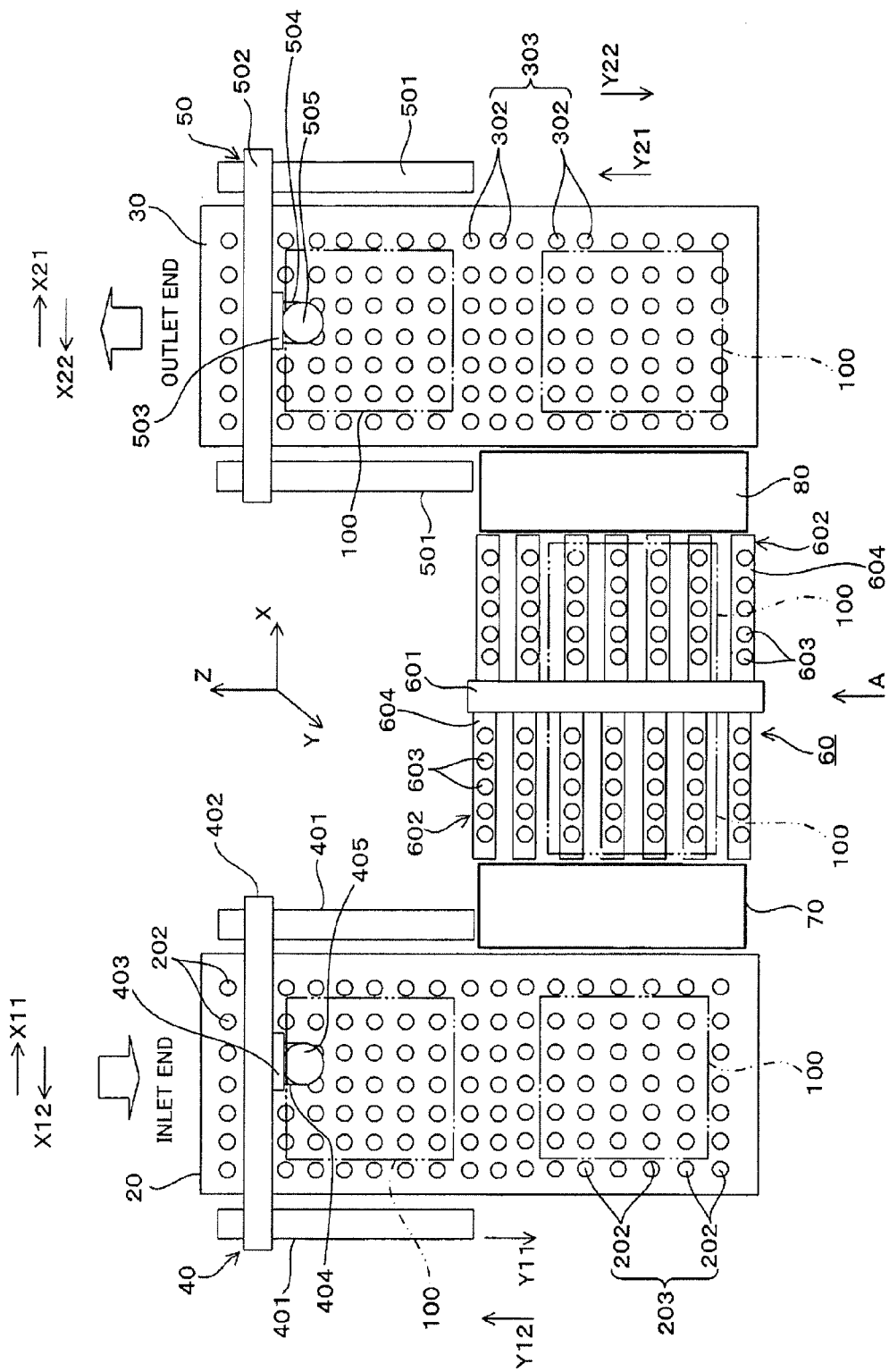
FIG. 1 is a plan view of a glazing gasket molding apparatus according to an embodiment of the present invention, which carries out a method of molding a glazing gasket onto a multilayer glass panel according to the present invention.
Figure 2:
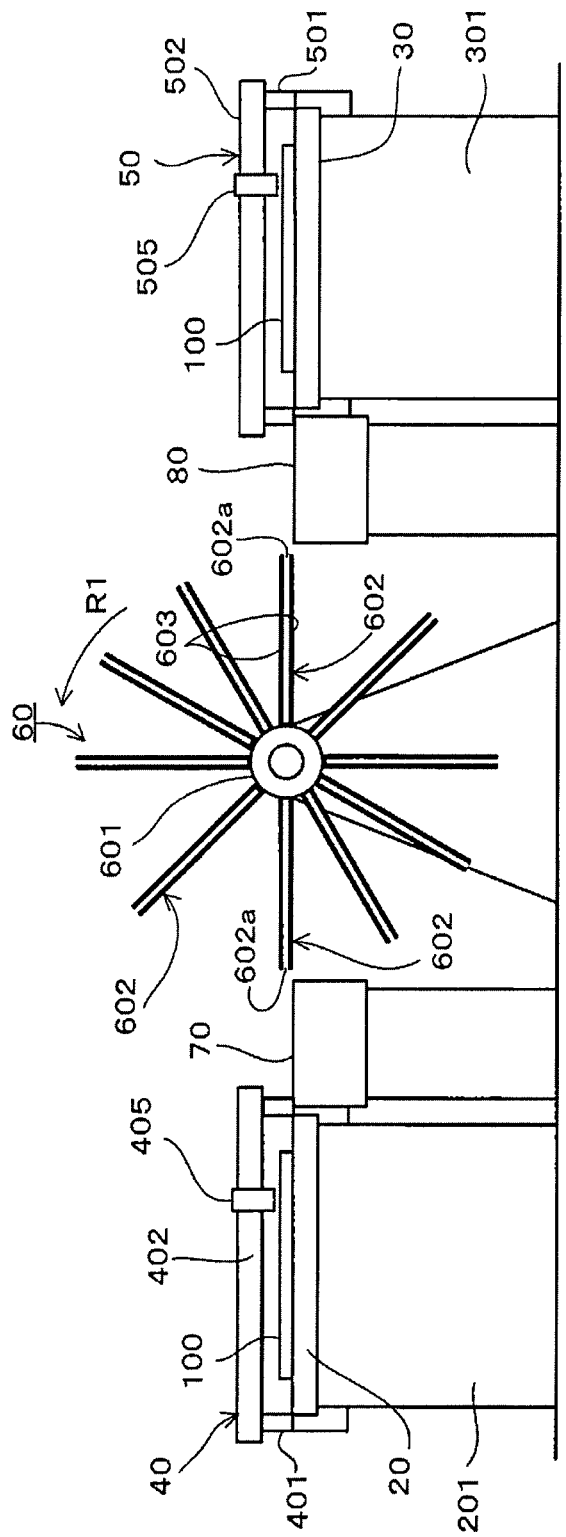
FIG. 2 is a side elevational view of the glazing gasket molding apparatus as viewed in the direction indicated by the arrow A in FIG. 1.

As shown in FIG. 1, the glazing gasket molding apparatus molds a glazing gasket onto a multilayer glass panel 100, with its plane oriented horizontally, by coating peripheral edge portions 100a, 100b (see FIGS. 3 and 5) of the face and back surfaces of the multilayer glass panel 100 with a molding material in respective different processes. As shown in FIGS. 1 and 2, the glazing gasket molding apparatus generally comprises a first worktable 20, a second worktable 30, a first coating mechanism 40, a second coating mechanism 50, an inverting mechanism 60, a first transfer mechanism 70, and a second transfer mechanism 80.

The inverting mechanism 60, the first transfer mechanism 70, and the second transfer mechanism 80 jointly serve as a feed mechanism as claimed.

In the description which follows, the directions indicated by the arrows X11. X12, X21, X22 will also be referred to as X-axis directions, and the directions indicated by the arrows Y11, Y12, Y21, Y22 as Y-axis directions.

As shown in FIGS. 1 and 2, the first worktable 20 is disposed horizontally on a base 201 and extends in the direction indicated by the arrow Y11 in FIG. 1. The multilayer glass panel 100 is placed horizontally on the first worktable 20, the multilayer glass panel 100 having one of its surfaces facing upwardly. The first worktable 20 incorporates a feed mechanism 203 comprising a number of rotatable feed balls 202 projecting upwardly from the upper surface of the first worktable 20 and arrayed in a matrix. The multilayer glass panel 100 on the first worktable 20 can be horizontally fed in the direction indicated by the arrow Y11 by the feed mechanism 203. The first worktable 20 also incorporates a moving feed mechanism, not shown, which is vertically movable, comprising a number of rotatable feed balls for moving the multilayer glass panel 100 on the first worktable 20 in the direction indicated by the arrow Y11. The multilayer glass panel 100 on the first worktable 20 can be moved in the direction indicated by the arrow Y11 by the moving feed mechanism which is elevated and actuated.

Each of the feed mechanism 203 and the moving feed mechanism may comprise a number of rollers or any of various known feeding members.

As shown in FIGS. 1 and 2, the second worktable 30 is disposed horizontally on a base 301 and extends in the direction indicated by the arrow Y21 in FIG. 1. The multilayer glass panel 100 is placed horizontally on the second worktable 30, the multilayer glass panel 100 having the other of its surfaces facing upwardly. The second worktable 30 incorporates a feed mechanism 303 comprising a number of rotatable feed balls 302 projecting upwardly from the upper surface of the second worktable 30 and arrayed in a matrix. The multilayer glass panel 100 on the second worktable 30 can be horizontally fed in the direction indicated by the arrow Y21 by the feed mechanism 303.

The second worktable 30 also incorporates a moving feed mechanism, not shown, which is vertically movable, comprising a number of rotatable feed balls for moving the multilayer glass panel 100 on the second worktable 30 in the direction indicated by the arrow Y21. The multilayer glass panel 100 on the second worktable 30 can be moved in the direction indicated by the arrow Y21 by the moving feed mechanism which is elevated and actuated.

Each of the feed mechanism 303 and the moving feed mechanism may comprise a number of rollers or any of various known structures.

The first coating mechanism 40 applies a glazing gasket 110 to the multilayer glass panel 100 that is placed horizontally on the first worktable 20 by coating a peripheral edge portion 100a of one of the surfaces of the multilayer glass panel 100 fully along the four sides thereof with an adhesive and a molding material.

Figure 3:
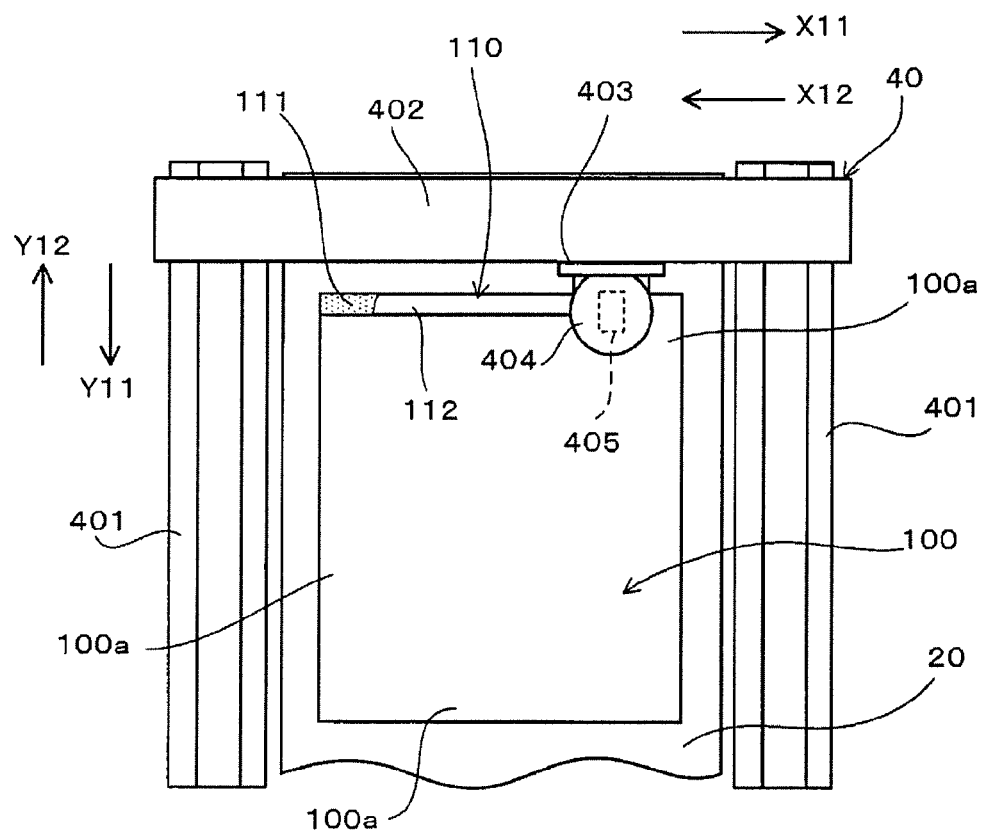
FIG. 3 is a plan view showing the positional relationship between a first coating mechanism and a multilayer glass panel and also showing the manner in which the glazing gasket molding apparatus operates to mold a glazing glass according to the embodiment of the present invention.
Figure 4:
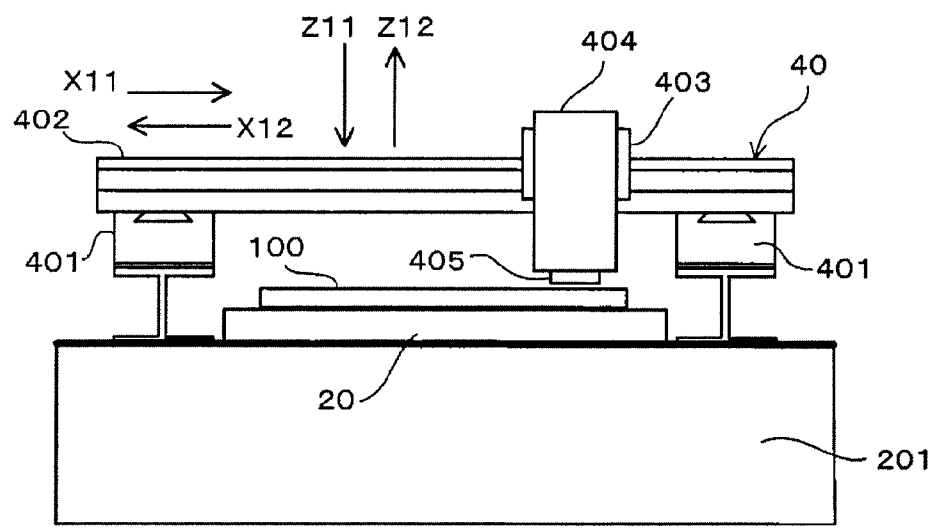
FIG. 4 is a front elevational view of the first coating mechanism and the multilayer glass panel shown in FIG. 3.

As shown in FIGS. 1, 3, and 4, the first coating mechanism 40 includes a pair of guide rails 401 disposed in respective mutually confronting positions on opposite sides of the first worktable 20 and extending parallel to each other in the direction indicated by the arrow Y11, and a first Y-axis slide 402 movably mounted on the guide rails 401 and extending perpendicularly between the guide rails 401, the first Y-axis slide 402 being movable in a horizontal plane on and along the guide rails 410 in the directions indicated by the arrows Y11, Y12. The first coating mechanism 40 also includes a first X-axis slide 403 movably mounted on the first Y-axis slide 402 and movable in a horizontal plane on and along the first Y-axis slide 402 in the directions indicated by the arrows X11, X12 which are perpendicular to the directions in which the first Y-axis slide 402 is movable, a first Z-axis slide 404 movably mounted on the first X-axis slide 403 and movable in a vertical plane on and along the first X-axis slide 403 in the directions indicated by the arrows Z11, Z12 which are perpendicular to the directions in which the first X-axis slide 403 is movable and the directions in which the first Y-axis slide 402 is movable, and a first coating gun 405 rotatably mounted on the first Z-axis slide 404 and rotatable about the vertical Z-axis of the first Z-axis slide 404, for coating the peripheral edge portion 100a of one of the surfaces of the multilayer glass panel 100 fully along the four sides thereof with an adhesive and a molding material. The first coating mechanism 40 comprises a so-called four-axis robot.

The first Y-axis slide 402 includes a known actuator, not shown, comprising a feed screw and a stepping motor and related mechanisms for rotating the feed screw about its own axis to automatically move the first Y-axis slide 402 in the directions indicated by the arrows Y11, Y12 under the control of a controller, not shown. Similarly, the first X-axis slide 403 also includes a known actuator, not shown, comprising a feed screw and a stepping motor and related mechanisms for rotating the feed screw about its own axis to automatically move the first X-axis slide 403 in the directions indicated by the arrows X11, X12 under the control of the non-illustrated controller, and the first Z-axis slide 404 also includes a known actuator, not shown, comprising a feed screw and a stepping motor and related mechanisms for rotating the feed screw about its own axis to automatically move the first Z-axis slide 404 in the directions indicated by the arrows Z11, Z12 under the control of the non-illustrated controller. The first coating gun 405 includes a known actuator, not shown, for turning the first coating gun 405 about the Z-axis.

The second coating mechanism 50 applies a glazing gasket 110 to the multilayer glass panel 100 that is placed horizontally on the second worktable 30 by coating a peripheral edge portion 100b of the other of the surfaces of the multilayer glass panel 100 fully along the four sides thereof with an adhesive and a molding material.

Figure 5:
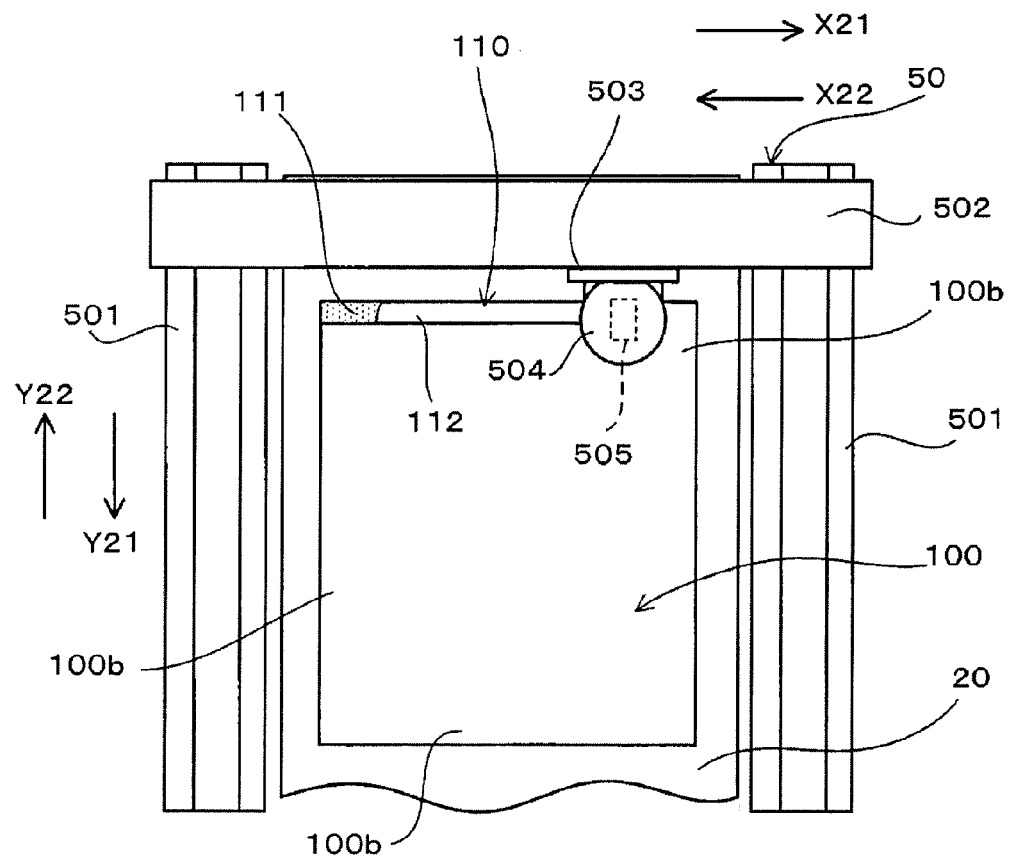
FIG. 5 is a plan view showing the positional relationship between a second coating mechanism and a multilayer glass panel and also showing the manner in which the glazing gasket molding apparatus operates to mold a glazing glass according to the embodiment of the present invention.
Figure 6:
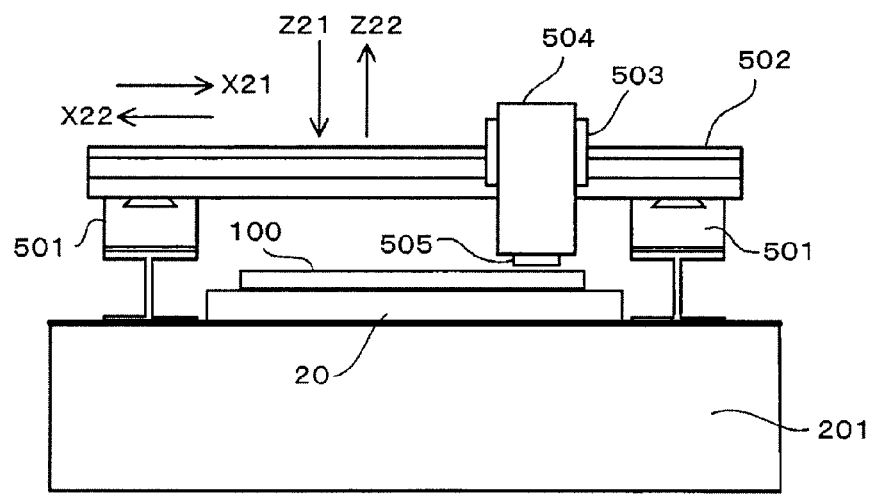
FIG. 6 is a front elevational view of the second coating mechanism and the multilayer glass panel shown in FIG. 5.

As shown in FIGS. 1, 5, and 6, the second coating mechanism 50 includes a pair of guide rails 501 disposed in respective mutually confronting positions on opposite sides of the second worktable 30 and extending parallel to each other in the direction indicated by the arrow Y21, and a second Y-axis slide 502 movably mounted on the guide rails 501 and extending perpendicularly between the guide rails 501, the second Y-axis slide 502 being movable in a horizontal plane on and along the guide rails 510 in the directions indicated by the arrows Y21, Y22. The second coating mechanism 50 also includes a second X-axis slide 503 movably mounted on the second Y-axis slide 502 and movable in a horizontal plane on and along the second Y-axis slide 502 in the directions indicated by the arrows X21, X22 which are perpendicular to the directions in which the second Y-axis slide 502 is movable, a second Z-axis slide 504 movably mounted on the second X-axis slide 503 and movable in a vertical plane on and along the second X-axis slide 503 in the directions indicated by the arrows Z21, Z22 which are perpendicular to the directions in which the second X-axis slide 503 is movable and the directions in which the second Y-axis slide 502 is movable, and a second coating gun 505 rotatably mounted on the second Z-axis slide 504 and rotatable about the vertical Z-axis of the second Z-axis slide 504, for coating the peripheral edge portion 100b of the other of the surfaces of the multilayer glass panel 100 fully along the four sides thereof with an adhesive and a molding material. The second coating mechanism 50 also comprises a so-called four-axis robot.

The second Y-axis slide 502 includes a known actuator, not shown, comprising a feed screw and a stepping motor and related mechanisms for rotating the feed screw about its own axis to automatically move the second Y-axis slide 502 in the directions indicated by the arrows Y21, Y22 under the control of a controller, not shown. Similarly, the second X-axis slide 503 also includes a known actuator, not shown, comprising a feed screw and a stepping motor and related mechanisms for rotating the feed screw about its own axis to automatically move the second X-axis slide 503 in the directions indicated by the arrows X21, X22 under the control of the non-illustrated controller, and the second Z-axis slide 504 also includes a known actuator, not shown, comprising a feed screw and a stepping motor and related mechanisms for rotating the feed screw about its own axis to automatically move the second Z-axis slide 504 in the directions indicated by the arrows Z21, Z22 under the control of the non-illustrated controller. The second coating gun 505 includes a known actuator, not shown, for turning the first coating gun 405 about the Z-axis.

The inverting mechanism 60 receives a multilayer glass panel 100 with a glazing gasket applied thereto by the first coating mechanism 40 from the first worktable 20, and inverts the multilayer glass panel 100 such that the surface thereof which is free of the glazing gasket faces upwardly. As shown in FIGS. 1 and 2, the inverting mechanism 60 comprises a rotational shaft 601 extending parallel to the direction in which the first and second worktables 20, 30 extend, and a plurality of holders 602 for hold respective multilayer glass panels 100. The holders 602 are connected to and extend radially outwardly from the rotational shaft 601. The holders 602 are angularly spaced at equal angular intervals of 30 degrees, for example.

The rotational shaft 601 is intermittently rotatable about its own axis by a known actuator, not shown, such that after the rotational shaft 602 is angularly moved through 30 degrees, for example, it is held at rest for 20 seconds.

The holders 602 comprise respective pairs of plates 604 extending along the axis of the rotational shaft 601. The plates 604 in each pair incorporate a number of feed balls 603 rotatably mounted on their confronting surfaces. Each holder 602 has an opening 602a defined in a radially outer end thereof remote from the rotational shaft 601 for allowing a multilayer glass panel 100 to be brought into and out of the space between the plates 604 through the opening 602a. The feed balls 603 be replaced with a number of rollers or any of various known feeding members.

The first feed mechanism 70 is disposed between the first worktable 20 and the inverting mechanism 60. The first feed mechanism 70 serves to feed a multilayer glass panel 100 with a glazing gasket applied thereto by the first coating mechanism 40 from the first worktable 20 to the inverting mechanism 60.

The second feed mechanism 80 is disposed between the inverting mechanism 60 and the second worktable 30. The second feed mechanism 80 serves to fed a multilayer glass panel 100 inserted by the inverting mechanism 60 from the inverting mechanism 60 to the second worktable 30.

The first feed mechanism 70 may be of any of various known structures. For example, the first feed mechanism 70 may comprise a feed table with a number of rotatable feed balls disposed thereon and a slider for feeding the multilayer glass panel 100 from the first worktable 20 over the feed table to one of the holders 602. Alternatively, the first feed mechanism 70 may comprise a plurality of vacuum pads for attracting the multilayer glass panel 100 under vacuum and feeding the attracted multilayer glass panel 100.

Likewise, the second feed mechanism 80 may be of any of various known structures. For example, the second feed mechanism 80 may comprise a feed table with a number of rotatable feed balls disposed thereon and a slider for feeding the multilayer glass panel 100 from one of the holders 602 over the feed table to the second worktable 30. Alternatively, the second feed mechanism 80 may comprise a plurality of vacuum pads for attracting the multilayer glass panel 100 under vacuum and feeding the attracted multilayer glass panel 100.

Operation of the glazing gasket molding apparatus for molding a glazing gasket onto a multilayer glass panel will be described below.

First, a multilayer glass panel 100 which is free of any glazing gaskets is introduced, with one of the surfaces thereof facing upwardly, onto the first worktable 20 through an inlet end of the first worktable 20. On the first worktable 20, the multilayer glass panel 100 is positioned and clamped on the first worktable 20 by a known positioning mechanism, not shown, on the first worktable 20. At this time, the known positioning mechanism grips lateral side edges of the multilayer glass panel 100.

Then, the non-illustrated controller controls the first Y-axis slide 402 and the first X-axis slide 403 of the first coating mechanism 40 to place the first coating gun 405 in a start position which faces the peripheral edge portion 100*a* of the multilayer glass panel 100.

The non-illustrated controller then controls the first Z-axis slide 404 to space the nozzle end of the first coating gun 405 from the peripheral edge portion 100*a* of the multilayer glass panel 100 by a certain distance. The non-illustrated controller also turns the first coating gun 405 with respect to the direction in which the first coating gun 405 is to move, thereby changing the orientation of the first coating gun 405 with respect to the peripheral edge portion 100*a* of the multilayer glass panel 100.

Then, a predetermined amount of melted molding material is supplied from a known extruding machine, not shown, to a molding material ejector such as a known shot pump or the like, not shown, and is temporarily stored in the molding material ejector. Simultaneously, a predetermined amount of melted hot-melt adhesive is supplied from a known adhesive supply pump, not shown, to an adhesive ejector such as a known shot pump or the like, not shown, and is temporarily stored in the adhesive ejector.

Thereafter, the adhesive ejector delivers the adhesive under pressure to the first coating gun 405, which discharges the adhesive toward the peripheral edge portion 100*a* of the upwardly facing surface of the multilayer glass panel 100, coating the peripheral edge portion 100*a* with a layer 111 of adhesive. At the same time, the molding material ejector delivers the molding material under pressure to the first coating gun 405, which discharges the molding material toward the peripheral edge portion 100*a*, applying a layer 112 of molding material to the applied layer 111 of adhesive on the peripheral edge portion 100*a*. The adhesive and the molding material are simultaneously supplied in respective layers to the first coating gun 405.

At this time, the first X-axis slide 403 moves the first coating gun 405 in the direction indicated by the arrow X11 (FIG. 3) from the start position to start applying the layer 111 of adhesive and the layer 112 of molding material to the peripheral edge portion 100*a* of the multilayer glass panel 100 along an upper side thereof as seen in FIG. 3.

When the first coating gun 405 reaches an upper right corner, as seen in FIG. 3, of the peripheral edge portion 100*a* of the multilayer glass panel 100, the first X-axis slide 403 stops moving the first coating gun 405 in the direction indicated by the arrow X11. The first coating gun 405 is turned to an angular position for applying a layer 111 of adhesive and a layer 112 of molding material to the peripheral edge portion 100*a* of the multilayer glass panel 100 along a right side thereof as seen in FIG. 3.

Thereafter, the first Y-axis slide 402 moves the first coating gun 405 in the direction indicated by the arrow Y11 in FIG. 3 to coat the peripheral edge portion 100*a* of the multilayer glass panel 100 with a layer 111 of adhesive and a layer 112 of molding material along the right side of the multilayer glass panel 100.

When the first coating gun 405 reaches a lower right corner, as seen in FIG. 3, of the peripheral edge portion 100*a* of the multilayer glass panel 100 upon the movement of the first Y-axis slide 402 in the direction indicated by the arrow Y11, the first X-axis slide 403 stops moving the first coating gun 405 in the direction indicated by the arrow Y11. At the same time, the first coating gun 405 is turned to an angular position for applying the layer 111 of adhesive and the layer 112 of molding material to the peripheral edge portion 100*a* of the multilayer glass panel 100 along a lower side thereof as seen in FIG. 3. Thereafter, the first Y-axis slide 402 moves the first coating gun 405 in the direction indicated by the arrow X12 in FIG. 3 to coat the peripheral edge portion 100*a* of the multilayer glass panel 100 with the layer 111 of adhesive and the layer 112 of molding material along the lower side of the multilayer glass panel 100.

When the first coating gun 405 reaches a lower left corner, as seen in FIG. 3, of the peripheral edge portion 100*a* of the multilayer glass panel 100 upon the movement of the first Y-axis slide 402 in the direction indicated by the arrow X12, the first X-axis slide 403 stops moving the first coating gun 405 in the direction indicated by the arrow X12. At the same time, the first coating gun 405 is turned to an angular position for applying the layer 111 of adhesive and the layer 112 of molding material to the peripheral edge portion 100*a* of the multilayer glass panel 100 along a left side thereof as seen in FIG. 3. Thereafter, the first Y-axis slide 402 moves the first coating gun 405 in the direction indicated by the arrow Y12 in FIG. 3 to coat the peripheral edge portion 100*a* of the multilayer glass panel 100 with the layer 111 of adhesive and the layer 112 of molding material along the left side of the multilayer glass panel 100.

Since the first coating gun 405 is thus moved by the first coating mechanism 40 in a square pattern on the peripheral edge portion 100*a* of the multilayer glass panel 100 along the four sides thereof, a glazing gasket 110 is molded on the peripheral edge portion 100*a* along the four sides of the multilayer glass panel 100. The glazing gasket 110 can be molded at a rate of 400 mm/sec, for example, in straight areas on the peripheral edge portion 100*a* of the multilayer glass panel 100. The first coating gun 405 can be repeatedly stopped at desired positions with a positional accuracy of ±0.1 mm, for example. When the first coating gun 405 moves around the corners of the peripheral edge portion 100*a* of the multilayer glass panel 100, the glazing gasket 110 is molded at a rate lower than 400 mm/sec.

At the time the glazing gasket 110 is molded on the peripheral edge portion 100*a* of the multilayer glass panel 100 fully along its entire length, i.e., along the four sides of the multilayer glass panel 100, the adhesive and the molding material that are discharged from the first coating gun 405 are cut off from the nozzle end of the first coating gun 405 by a known cutter mechanism, not shown, mounted on the first coating mechanism 40. Therefore, the first coating gun 405 is made ready for a next cycle of coating operation.

Upon completion of the molding by the first coating mechanism 40 of the glazing gasket 110 on the surface of the multilayer glass panel 100 on the first worktable 20, the multilayer glass panel 100 is fed by the feed mechanism 203 over the first worktable 20 in the direction indicated by the arrow Y11 away from the inlet end of the first worktable 20. When the multilayer glass panel 100 reaches a position aligned with the first transfer mechanism 70, the multilayer glass panel 100 is transferred from the first worktable 20 to the inverting mechanism 60, and stored in one of the holders 602.

A multilayer glass panel 100 is introduced into the inverting mechanism 60 each time it is coated by the first coating mechanism 40 on the first worktable 20 and the inverting mechanism 60 is turned through 30 degrees at an interval of 20 seconds.

While the inverting mechanism 60 is being angularly moved through 180 degrees in the direction indicated by the arrow R1 (see FIG. 2), the glazing gasket 110 molded on the multilayer glass panel 100 stored in the one of the holders 602 is solidified, and the multilayer glass panel 100 is inverted such that the other surface thereof which is free from the molded glazing gasket 110 faces upwardly.

The inverted multilayer glass panel 100 is transferred from the inverting mechanism 60 onto the second worktable 30 by the second transfer mechanism 80.

On the second worktable 30, the multilayer glass panel 100 is fed to the second coating mechanism 50 by the feed mechanism 303. The multilayer glass panel 100 is then positioned and clamped on the second worktable 20 by a known positioning mechanism, not shown, on the second worktable 20. At this time, the known positioning mechanism grips lateral side edges of the multilayer glass panel 100.

Then, the non-illustrated controller controls the second Y-axis slide 502 and the second X-axis slide 503 of the second coating mechanism 50 to place the second coating gun 505 in a start position which faces the peripheral edge portion 100b of the multilayer glass panel 100.

The non-illustrated controller then controls the second Z-axis slide 504 to space the nozzle end of the second coating gun 505 from the peripheral edge portion 100b of the multilayer glass panel 100 by a certain distance. The non-illustrated controller also turns the second coating gun 505 with respect to the direction in which the second coating gun 505 is to move, thereby changing the orientation of the second coating gun 505 with respect to the peripheral edge portion 100b of the multilayer glass panel 100.

Then, a predetermined mount of melted molding material is supplied from a known extruding machine, not shown, to a molding material ejector such as a known shot pump or the like, not shown, and is temporarily stored in the molding material ejector. Simultaneously, a predetermined amount of melted hot-melt adhesive is supplied from a known adhesive supply pump, not shown, to an adhesive ejector such as a known shot pump or the like, not shown, and is temporarily stored in the adhesive ejector.

Thereafter, the adhesive ejector delivers the adhesive under pressure to the second coating gun 505, which discharges the adhesive toward the peripheral edge portion 100b of the upwardly facing surface of the multilayer glass panel 100, coating the peripheral edge portion 100b with a layer 111 of adhesive. At the same time, the molding material ejector delivers the molding material under pressure to the second coating gun 505, which discharges the molding material toward the peripheral edge portion 100b, applying a layer 112 of molding material to the applied layer 111 of adhesive on the peripheral edge portion 100b. The adhesive and the molding material are simultaneously supplied in respective layers to the second coating gun 505.

At this time, the second X-axis slide 503 moves the second coating gun 505 in the direction indicated by the arrow X21 (FIG. 5) from the start position to start applying the layer 111 of adhesive and the layer 112 of molding material to the peripheral edge portion 100b of the multilayer glass panel 100 along an upper side thereof as seen in FIG. 5.

When the second coating gun 505 reaches an upper right corner, as seen in FIG. 5, of the peripheral edge portion 100b of the multilayer glass panel 100, the second X-axis slide 503 stops moving the second coating gun 505 in the direction indicated by the arrow X21. The second coating gun 505 is turned to an angular position for applying a layer 111 of adhesive and a layer 112 of molding material to the peripheral edge portion 100b of the multilayer glass panel 100 along a right side thereof as seen in FIG. 3.

Thereafter, the second Y-axis slide 502 moves the second coating gun 505 in the direction indicated by the arrow Y21 in FIG. 5 to coat the peripheral edge portion 100b of the multilayer glass panel 100 with a layer 111 of adhesive and a layer 112 of molding material along the right side of the multilayer glass panel 100.

When the second coating gun 505 reaches a lower right corner, as seen in FIG. 5, of the peripheral edge portion 100b of the multilayer glass panel 100 upon the movement of the second Y-axis slide 502 in the direction indicated by the arrow Y21, the second X-axis slide 503 stops moving the second coating gun 505 in the direction indicated by the arrow Y21. At the same time, the second coating gun 505 is turned to an angular position for applying the layer 111 of adhesive and the layer 112 of molding material to the peripheral edge portion 100b of the multilayer glass panel 100 along a lower side thereof as seen in FIG. 5. Thereafter, the second Y-axis slide 502 moves the second coating gun 505 in the direction indicated by the arrow X22 in FIG. 5 to coat the peripheral edge portion 100b of the multilayer glass panel 100 with the layer 111 of adhesive and the layer 112 of molding material along the lower side of the multilayer glass panel 100.

When the second coating gun 505 reaches a lower left corner, as seen in FIG. 5, of the peripheral edge portion 100b of the multilayer glass panel 100 upon the movement of the second Y-axis slide 502 in the direction indicated by the arrow X22, the second X-axis slide 503 stops moving the second coating gun 505 in the direction indicated by the arrow X22. At the same time, the second coating gun 505 is turned to an angular position for applying the layer 111 of adhesive and the layer 112 of molding material to the peripheral edge portion 100b of the multilayer glass panel 100 along a left side thereof as seen in FIG. 5. Thereafter, the second Y-axis slide 502 moves the second coating gun 505 in the direction indicated by the arrow Y22 in FIG. 5 to coat the peripheral edge portion 100b of the multilayer glass panel 100 with the layer 111 of adhesive and the layer 112 of molding material along the left side of the multilayer glass panel 100.

Since the second coating gun 505 is thus moved by the second coating mechanism 50 in a square pattern on the peripheral edge portion 100b of the multilayer glass panel 100 along the four sides thereof, a glazing gasket 110 is molded on the peripheral edge portion 100b along the four sides of the multilayer glass panel 100. The glazing gasket 110 can be molded at a rate of 400 mm/sec, in straight areas on the peripheral edge portion 100b of the multilayer glass panel 100. The second coating gun 505 can be repeatedly stopped at desired positions with a positional accuracy of ±0.1 mm. When the second coating gun 505 moves around the corners of the peripheral edge portion 100b of the multilayer glass panel 100, the glazing gasket 110 is molded at a rate lower than 400 mm/sec.

At the time the glazing gasket 110 is molded on the peripheral edge portion 100b of the multilayer glass panel 100 fully along its entire length, i.e., along the four sides of the multilayer glass panel 100, the adhesive and the molding material that are discharged from the second coating gun 505 are cut off from the nozzle end of the second coating gun 505 by a known cutter mechanism, not shown, mounted on the second coating mechanism 50. Therefore, the second coating gun 505 is made ready for a next cycle of coating operation. After the glazing gaskets 110 have been molded on the peripheral edge portions on the respective face and back surfaces of the multilayer glass panel 100, the multilayer glass panel 100 is unloaded from the second worktable 30 through an outlet end thereof.

In the present embodiment, as described above, the first coating gun 405 is moved by the first coating mechanism 40 along the peripheral edge portion 100a of one of the surfaces of the multilayer glass panel 100 that is horizontally placed on the first worktable 20, while applying the adhesive and the molding material to the peripheral edge portion 100a along successively the four sides of the multilayer glass panel 100, thus molding the glazing gasket 110 thereon. Then, the multilayer glass panel 100 with the glazing gasket 110 molded on the surface thereof is transferred from the first worktable 20 to the inverting mechanism 60 by the first transfer mechanism 70. The inverting mechanism 60 inverts the multilayer glass panel 100 until the other surface thereof which is free of a glazing gasket faces upwardly. The inverted multilayer glass panel 100 is transferred from the inverting mechanism 60 to the second worktable 30 by the second transfer mechanism 80, and is horizontally placed on the second worktable 30. On the second worktable 30, first coating gun 405 is moved by the second coating mechanism 50 along the peripheral edge portion 100b of the other surface of the multilayer glass panel 100, while applying the adhesive and the molding material to the peripheral edge portion 100b along successively the four sides of the multilayer glass panel 100, thus molding the glazing gasket 110 thereon.

The adhesive and the molding material may be applied to the peripheral edge portions 100a, 100b of the multilayer glass panel 100 by holding the multilayer glass panel 100 at rest and moving the first and second coating guns 405, 505, or by holding the first and second coating guns 405, 505 at rest and moving the multilayer glass panel 100, or by moving the first and second coating guns 405, 505 only in one of the X-axis and Y-axis directions and moving the multilayer glass panel 100 only in the other of the X-axis and Y-axis directions.

Inasmuch as the multilayer glass panel 100 is horizontally placed on the first worktable 20 or the second worktable 30, the entire area of the multilayer glass panel 100 is supported from below. Accordingly, even if the multilayer glass panel 100 has a size of 2400 mm×1500 mm or greater, the multilayer glass panel 100 will not be flexed by gravity on the first worktable 20 or the second worktable 30.

The multilayer glass panel 100 is coated, on one surface at a time, with the adhesive and the molding material by the coating gun while the multilayer glass panel 100 is being horizontally supported on the worktable. Consequently, the multilayer glass panel 100 is prevented from being unduly flexed and damaged when the layers of adhesive and molding material are applied to the peripheral edge portions of the multilayer glass panel 100.

The adhesive and molding material can thus be applied as layers of uniform thickness on the multilayer glass panel 100 without adhesive bonding failures, making it possible to mold glazing gaskets highly accurately on the multilayer glass panel 100. The multilayer glass panel 100 can be coated with the adhesive and the molding material at a high rate such as of 400 mm/sec. The glazing gaskets can automatically be molded on the multilayer glass panel 100 by applying the molding material.

When the multilayer glass panel 100 is inverted by the inverting mechanism 60 to turn the surface thereof which is free of any glazing gasket to face upwardly, the glazing gasket which has already been molded on the other surface of the multilayer glass panel 100 is exposed to the atmosphere. While the multilayer glass panel 100 is being inverted, the molded glazing gasket is sufficiently solidified. The molded glazing gasket is therefore prevented from being dented or damaged when it will subsequently be transferred from the inverting mechanism 60 to the second worktable 30.

Structural details of the first coating gun 405 and the second coating gun 505 will be described below.

Figure 7:
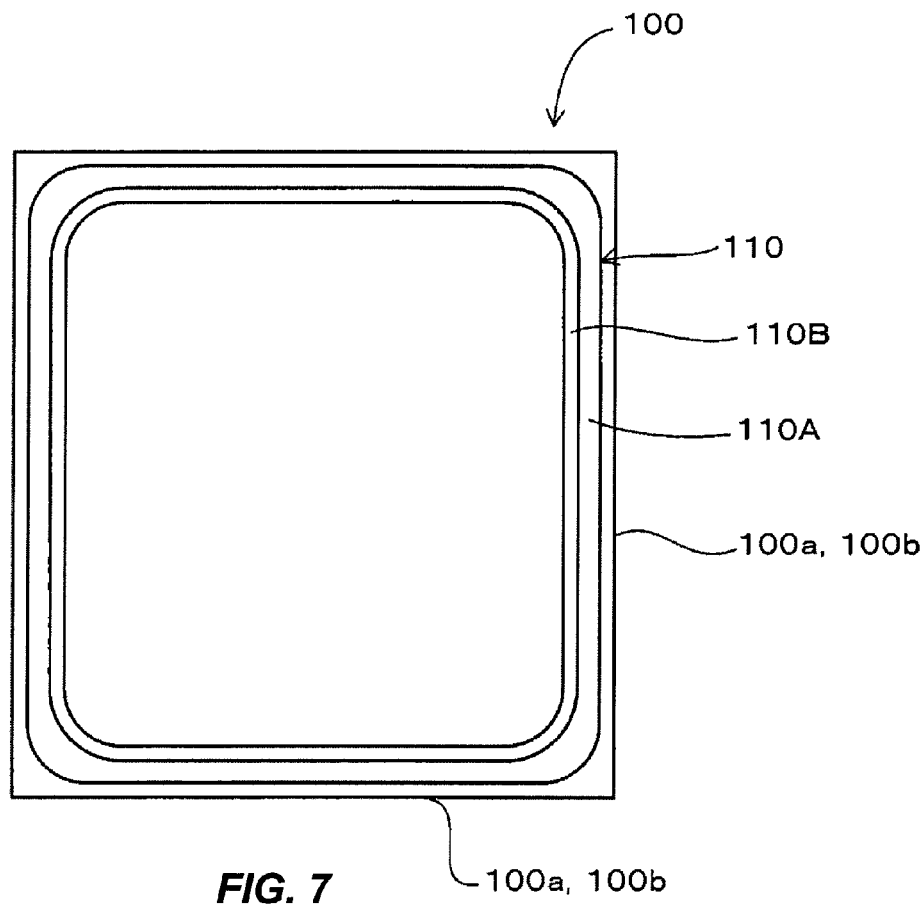
FIG. 7 is a plan view of a multilayer glass panel with a glazing gasket molded thereon.
Figure 8:
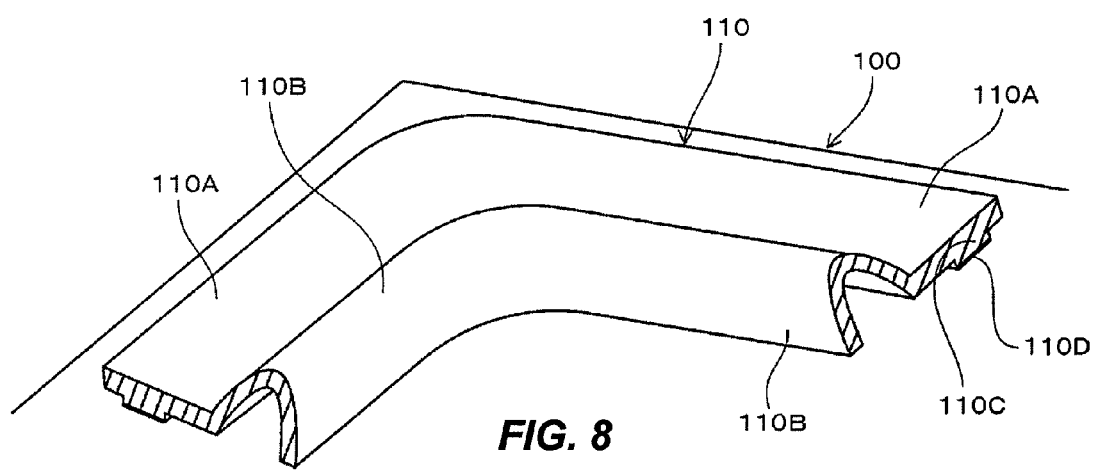
FIG. 8 is an enlarged fragmentary view, partly cut away, of a corner of the multilayer glass panel.

As shown in FIGS. 7 and 8, the glazing gasket 110 is molded on each of the surfaces of the multilayer glass panel 100. On each of the surfaces of the multilayer glass panel 100, the glazing gasket 110 extends as a rectangular frame along the peripheral edge portion 100a or 100b of the multilayer glass panel 100.

As shown in FIG. 8, the glazing gasket 110 has a cross-sectional shape, taken perpendicularly to the direction in which the glazing gasket 110 extends, including a base 110A extending horizontally, a protrusion 110B joined to the base 110A and projecting upwardly away from the multilayer glass panel 100, and a lower strip 110CC extending along the base 110A and projecting downwardly toward the multilayer glass panel 100 from a transversely central portion of the base 110A.

The glazing gasket 110 is bonded to the multilayer glass panel 100 by an adhesive layer 110D on the lower surface of the lower strip 110C.

Figure 10:
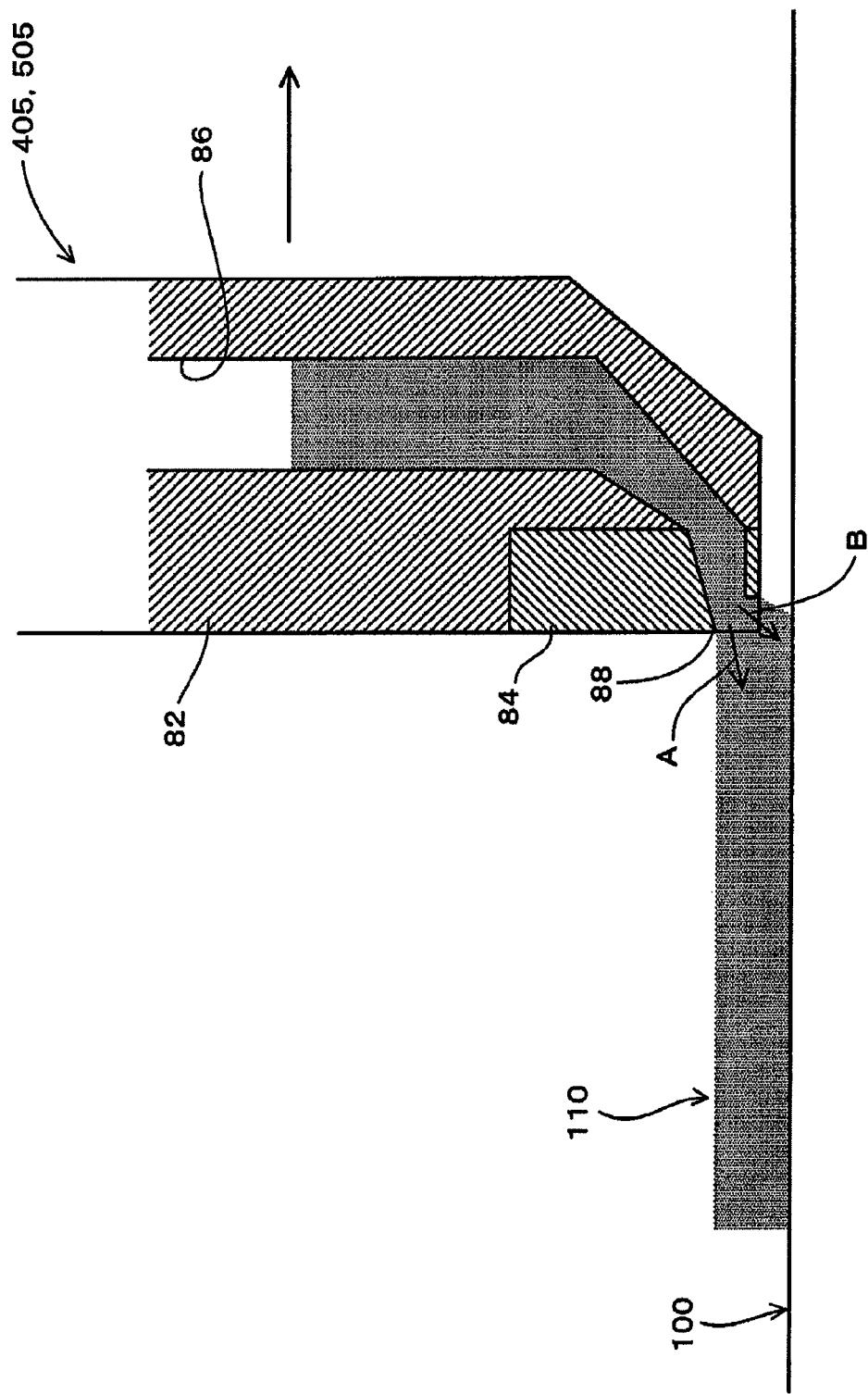
FIG. 10 is an enlarged cross-sectional view of a coating gun and a molding die, showing the manner in which they coat a multilayer glass panel with a molding material.
Figure 11:
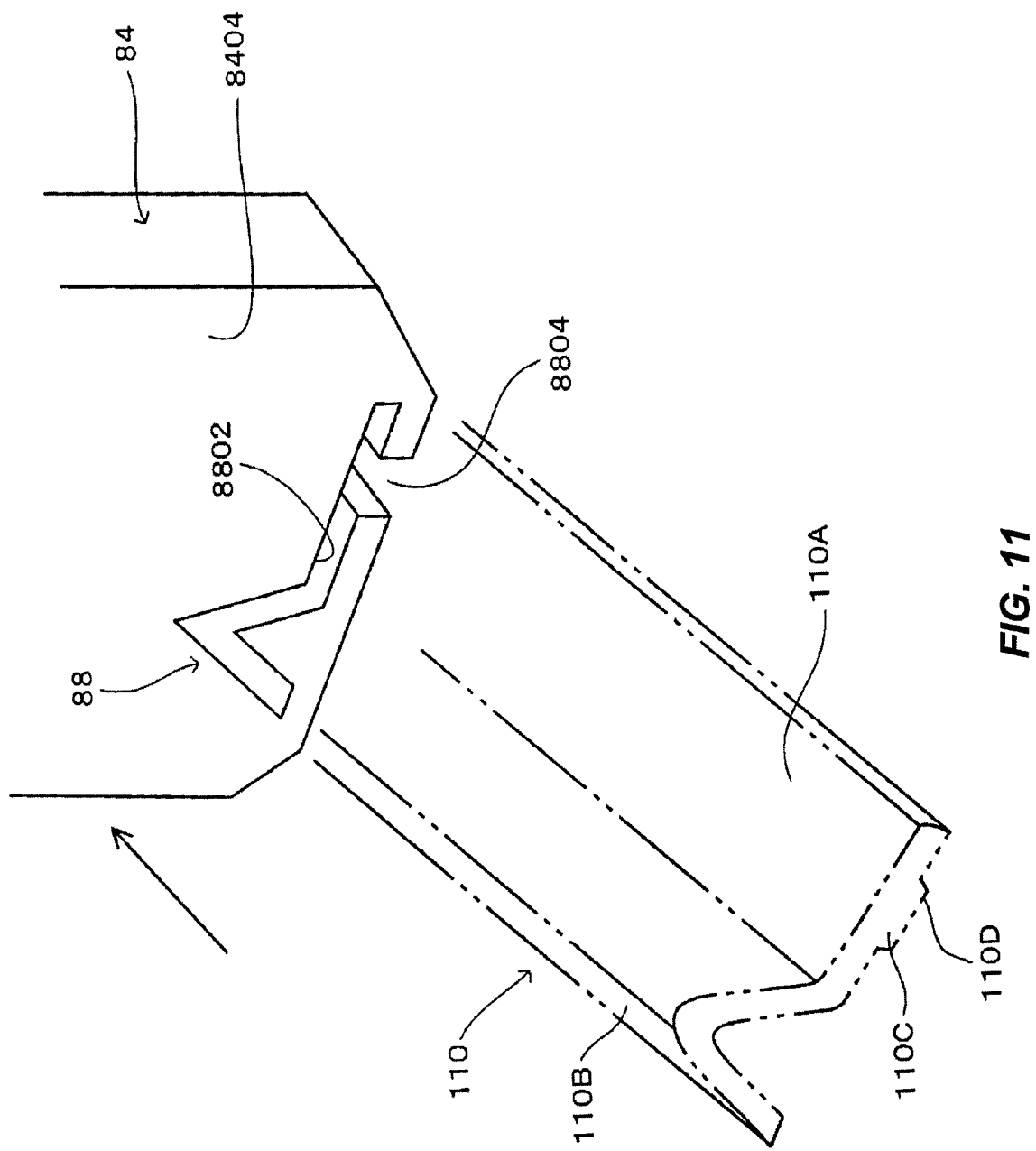
FIG. 11 is a perspective view of the molding die and the molding material, showing the manner in which the molding die coats the multilayer glass panel with the molding material.
Figure 12:
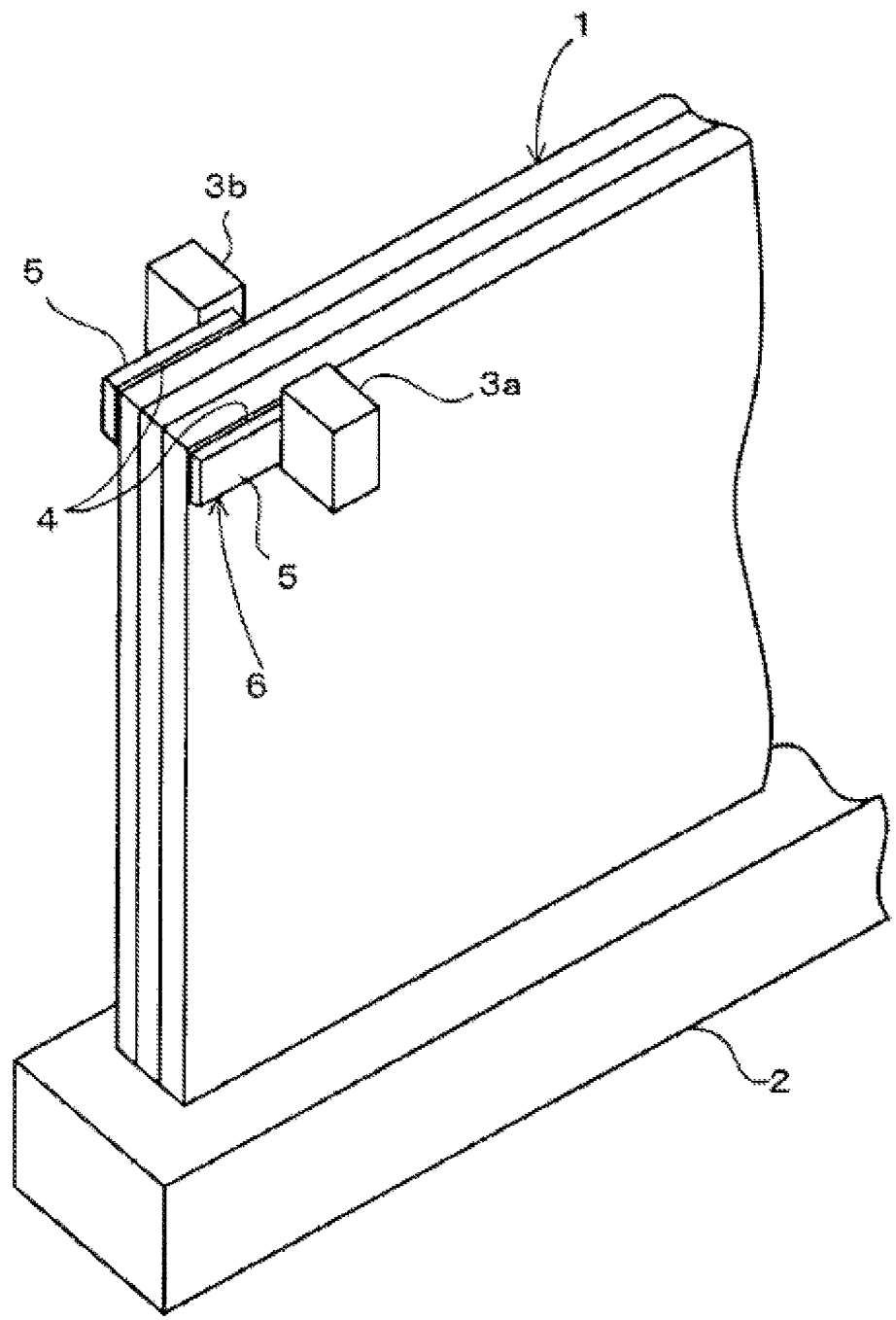
FIG. 12 is a fragmentary perspective view showing the manner in which a glazing gasket is molded onto a multilayer glass panel according to the background art.

As shown in FIG. 10, each of the first coating gun 405 and the second coating gun 505 comprises a gun body 82 and a molding die 84 mounted on the gun body 82 for molding a glazing gasket.

The gun body 82 and the molding die 84 have a molding material supply passage 86 defined therein for being supplied with a melted molding material. The molding material supply passage 86 is connected to an extrusion port 88 defined in the molding die 84.

When the molding material is supplied through the molding material supply passage 86 to the extrusion port 88, the adhesive is also supplied through a portion of the molding material supply passage 86 which leads to a second opening 8804 (see FIGS. 9A, 9B, 9C), to be described later, beneath the molding material supplied through the molding material supply passage 86. In other words, the molding material and the adhesive are supplied in two respective layers through the extrusion port 88.

Figure 9A:
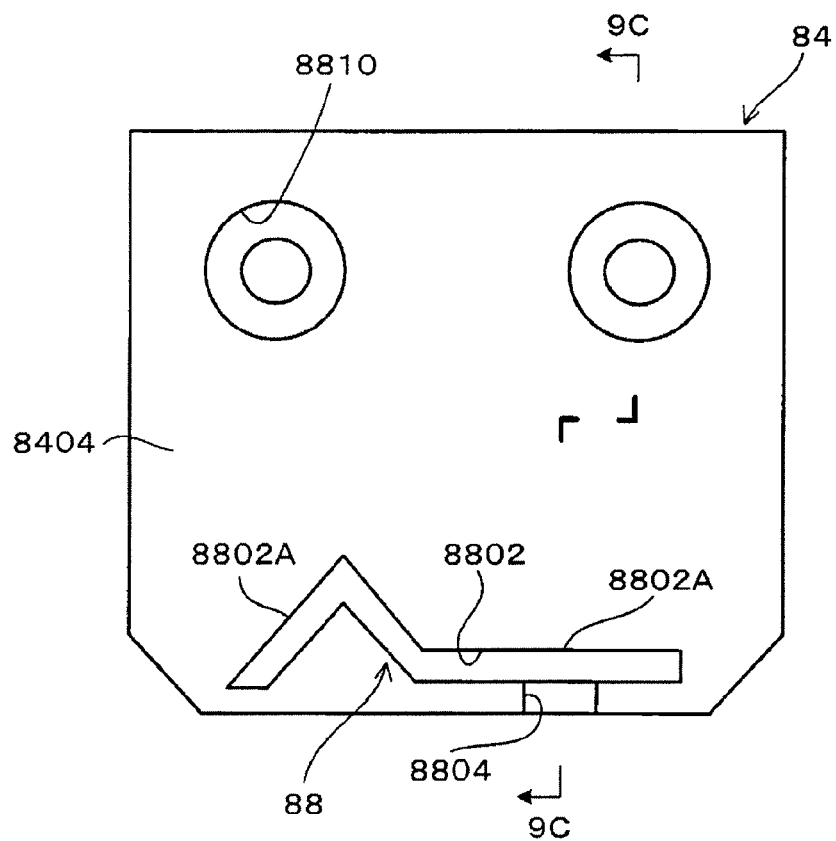
FIG. 9A is a plan view of a molding die.
Figure 9B:
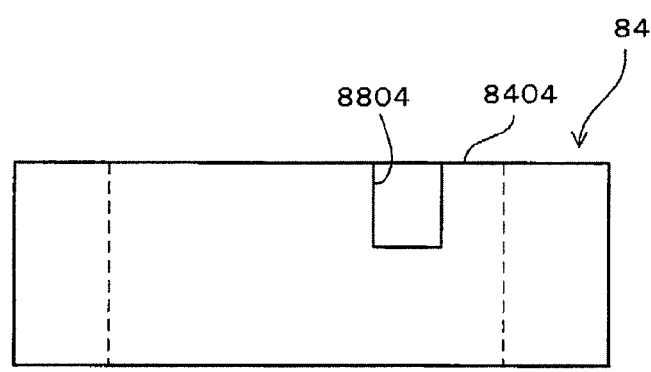
FIG. 9B is a side elevational view of the molding die.
Figure 9C:
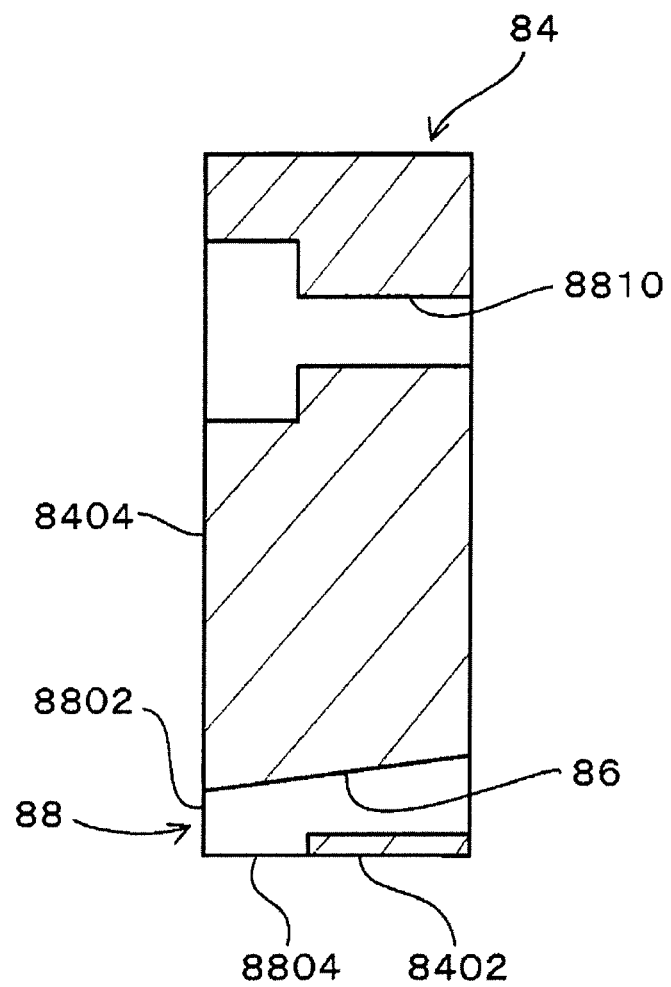
FIG. 9C is a cross-sectional view taken along line 9C-9C of FIG. 9A.

While the gun body 82 and the molding die 84 are being horizontally moved over the upwardly facing surface of the horizontally placed multilayer glass panel 100, the molding material and the adhesive are extruded from the extrusion port 88 onto the surface of the multilayer glass panel 100 to mold the glazing gasket 110 thereon. As shown in FIGS. 9A, 9B, 9C, the molding die 84 has a bottom surface 8402 facing the surface of the multilayer glass panel 100 and a side surface 8404 having a height rising from the bottom surface 8402 and a width perpendicular to the height.

The side surface 8404 serves as a trailing end surface of the molding die 84 at the time the first molding gun 405 and the second molding gun 505 are moved along the peripheral edge portions 100*a*, 100*b* of the multilayer glass panel 100.

The extrusion port 88 includes a first opening 8802 and a second opening 8804.

The first opening 8802 extends in the width-wise direction of the side surface 8404 and is open in a portion of the side surface 8404 which is spaced from the bottom surface 8402. More specifically, the first opening 8802 has a base portion 8802A extending in the widthwise direction of the side surface 8404 and a bent portion 8802B joined to an end of the base portion 8802A and bent upwardly away from the bottom surface 8804.

The second opening 8804 has a length in the widthwise direction of the side surface 8404, which is smaller than the length of the first opening 8802, and is open in the side surface 8404 and the bottom surface 8402 such that a portion of the molding material supply passage 86 near the first opening 8802 is open in respective portions of the side surface 8404 and the bottom surface 8402 beneath the first opening 8802.

More specifically, the second opening 8804 is open in the side surface 8404 and the bottom surface 8402 such that the portion of the molding material supply passage 86 near the first opening 8802 is open in respective portions of the side surface 8404 and the bottom surface 8402 beneath a longitudinally central portion of the base portion 8802A.

The molding die 84 is fastened to the gun body 82 by bolts inserted through a pair of bolt holes 8810 defined in the molding die 84.

When the molding die 84 is horizontally moved over the upwardly facing surface of the multilayer glass panel 100, the molding material is extruded from the first opening 8802 onto the surface of the multilayer glass panel 100 in a first obliquely downward direction indicated by the arrow A. At the same time, the molding material is also extruded from the second opening 8804 onto the surface of the multilayer glass panel 100 in a second obliquely downward direction indicated by the arrow B which is inclined more downwardly than the first obliquely downward direction indicated by the arrow A.

Since the molding material is extruded under pressure from the second opening 8804 onto the surface of the multilayer glass panel 100, the glazing gasket 110 is securely bonded to the surface of the multilayer glass panel 100 by the adhesive layer 110D on the lower strip 110C.

Even when the first coating gun 405 and the second coating gun 505 are turned through an angle of 90 degrees at the corners of the multilayer glass panel 100 and also moved at a high speed along the peripheral edge portions 100*a*, 100*b* of the multilayer glass panel 100, the glazing gasket 110 is securely bonded to the surface of the multilayer glass panel 100 against the possibility of being unduly lifted off.

Consequently, when the multilayer glass panel 100 with the glazing gaskets 110 molded thereon is set into a sash, the glazing gaskets 110 are prevented from being caught by the sash and also from being peeled off thereby. The multilayer glass panel 100 with the glazing gaskets 110 can thus be assembled into the sash highly efficiently.

In the above embodiment, the adhesive and the molding material are simultaneously supplied in respective layers to the molding die 84. However, the adhesive may be applied in advance to the multilayer glass panel 100, and the molding material may subsequently be applied to the multilayer glass panel 100 over the applied adhesive.

The invention claimed is:

1. A method of molding a glazing gasket onto a multilayer glass panel by applying a molding material to a peripheral edge portion of the multilayer glass panel, comprising the steps of:
    placing said multilayer glass panel on a first worktable with one surface of said multilayer glass panel facing upwardly;
    moving a first coating gun along the peripheral edge portion of said one surface of said multilayer glass panel on said first worktable and discharging the molding material from said first coating gun to coat said peripheral edge portion over an entire length thereof with the molding material for thereby molding the glazing gasket on said peripheral edge portion of said one surface of said multilayer glass panel;
    inverting said multilayer glass panel with said glazing gasket molded thereon by said first coating gun such that another surface of said multilayer glass panel which is free of said glazing gasket faces upwardly;
    placing the inverted multilayer glass panel on a second worktable with said other surface of said multilayer glass panel facing upwardly; and
    moving a second coating gun along the peripheral edge portion of said other surface of said multilayer glass panel on said second worktable and discharging the molding material from said second coating gun to coat said peripheral edge portion over an entire length thereof with the molding material for thereby molding the glazing gasket on said peripheral edge portion of said other surface of said multilayer glass panel.

2. A method according to claim 1, wherein said glazing gasket molded on said peripheral edge portion of said one surface of said multilayer glass panel is solidified while said multilayer glass panel is being inverted.

3. An apparatus for molding a glazing gasket onto a multilayer glass panel by applying a molding material to a peripheral edge portion of the multilayer glass panel, comprising:
    a first worktable for placing thereon said multilayer glass panel with one surface of said multilayer glass panel facing upwardly;
    a second worktable for placing thereon said multilayer glass panel with another surface of said multilayer glass panel facing upwardly;
    a first coating mechanism for coating the peripheral edge portion of said one surface of said multilayer glass panel on said first worktable with the molding material for thereby molding the glazing gasket on said peripheral edge portion of said one surface of said multilayer glass panel;
    a feed mechanism for feeding said multilayer glass panel with said glazing gasket molded thereon by said first coating mechanism from said first worktable, inverting said multilayer glass panel such that said other surface of said multilayer glass panel which is free of said glazing gasket faces upwardly, and placing the inverted multilayer glass panel on the second worktable; and
    a second coating mechanism for coating the peripheral edge portion of said other surface of said multilayer glass panel on said second worktable with the molding material for thereby molding the glazing gasket on said peripheral edge portion of said other surface of said multilayer glass panel.

4. An apparatus according to claim 3, wherein said feed mechanism comprises:
- an inverting mechanism for inverting said multilayer glass panel with said glazing gasket molded thereon by said first coating mechanism such that said other surface of said multilayer glass panel which is free of said glazing gasket faces upwardly;
- a first feed mechanism for feeding said multilayer glass panel with said glazing gasket molded thereon by said first coating mechanism from said first worktable to said inverting mechanism; and
- a second feed mechanism for feeding said multilayer glass panel inverted by said inverting mechanism from said inverting mechanism to said second worktable.

5. An apparatus according to claim 4, wherein said inverting mechanism comprises:
- a rotational shaft; and
- a plurality of holders for holding respective multilayer glass panels, said holders extending radially outwardly from said rotational shaft and angularly spaced at equal angular intervals.

6. An apparatus according to claim 3, wherein said multilayer glass panel is horizontally placed on said first worktable;
- said first worktable is capable of moving said multilayer glass panel placed thereon in a direction along a plane of said multilayer glass panel; and
- said first coating mechanism comprises:
  - a first Y-axis slide movable over said multilayer glass panel on said first worktable in directions along the direction in which said multilayer glass panel is movable;
  - a first X-axis slide movably mounted on said first Y-axis slide and movable in a horizontal plane on and along said first Y-axis slide in directions which are perpendicular to the directions in which said first Y-axis slide is movable;
  - a first Z-axis slide movably mounted on said first X-axis slide and movable in a vertical plane on and along said first X-axis slide in directions which are perpendicular to the directions in which said first X-axis slide is movable and the directions in which said first Y-axis slide is movable; and
  - a first coating gun rotatably mounted on said first Z-axis slide and rotatable about a vertical Z-axis of said first Z-axis slide, for coating the peripheral edge portion of said one surface of the multilayer glass panel over an entire length of the peripheral edge portion with said molding material.

7. An apparatus according to claim 3, wherein said multilayer glass panel is horizontally placed on said second worktable;
- said second worktable is capable of moving said multilayer glass panel placed thereon in a direction along a plane of said multilayer glass panel; and
- said second coating mechanism comprises:
  - a second Y-axis slide movable over said multilayer glass panel on said second worktable in directions along the direction in which said multilayer glass panel is movable;
  - a second X-axis slide movably mounted on said second Y-axis slide and movable in a horizontal plane on and along said second Y-axis slide in directions which are perpendicular to the directions in which said second Y-axis slide is movable;
  - a second Z-axis slide movably mounted on said second X-axis slide and movable in a vertical plane on and along said second X-axis slide in directions which are perpendicular to the directions in which said second X-axis slide is movable and the directions in which said second Y-axis slide is movable; and
  - a second coating gun rotatably mounted on said second Z-axis slide and rotatable about a vertical Z-axis of said second Z-axis slide, for coating the peripheral edge portion of said other surface of the multilayer glass panel over an entire length of the peripheral edge portion with said molding material.

8. A method of molding a glazing gasket onto a peripheral edge portion of each of first and second surfaces of multilayer glass panel, comprising the steps of:
- placing said multilayer glass panel horizontally on a first worktable with the first surface of said multilayer glass panel facing upwardly;
- applying a molding material to the peripheral edge portion of said first surface of said multilayer glass panel on said first worktable along an entire length of the peripheral edge portion for thereby molding the glazing gasket on said peripheral edge portion of said first surface of said multilayer glass panel;
- inverting said multilayer glass panel with said glazing gasket molded thereon until the second surface of said multilayer glass panel which is free of said glazing gasket faces upwardly;
- placing the inverted multilayer glass panel horizontally on a second worktable with said second surface of said multilayer glass panel facing upwardly; and
- applying the molding material to the peripheral edge portion of said second surface of said multilayer glass panel on said second worktable along an entire length of the peripheral edge portion for thereby molding the glazing gasket on said peripheral edge portion of said second surface of said multilayer glass panel.

9. A method according to claim 8, further comprising the step of:
- applying an adhesive to the peripheral edge portion of said first surface of said multilayer glass panel on said first worktable along the entire length of the peripheral edge portion to provide a layer of adhesive beneath the molding material applied to the peripheral edge portion of said first surface of said multilayer glass panel; and
- applying the adhesive to the peripheral edge portion of said second surface of said multilayer glass panel on said second worktable along the entire length of the peripheral edge portion to provide a layer of adhesive beneath the molding material applied to the peripheral edge portion of said second surface of said multilayer glass panel.

10. An apparatus according to claim 4, wherein said multilayer glass panel is horizontally placed on said first worktable;
- said first worktable is capable of moving said multilayer glass panel placed thereon in a direction along a plane of said multilayer glass panel; and
- said first coating mechanism comprises:
  - a first Y-axis slide movable over said multilayer glass panel on said first worktable in directions along the direction in which said multilayer glass panel is movable;
  - a first X-axis slide movably mounted on said first Y-axis slide and movable in a horizontal plane on and along said first Y-axis slide in directions which are perpendicular to the directions in which said first Y-axis slide is movable;
  - a first Z-axis slide movably mounted on said first X-axis slide and movable in a vertical plane on and along said first X-axis slide in directions which are perpendicular to the directions in which said first X-axis slide is movable and the directions in which said first Y-axis slide is movable; and a first coating gun rotatably mounted on said first Z-axis slide and rotatable about a vertical Z-axis of said first Z-axis slide, for coating the peripheral edge portion of said one surface of the multilayer glass panel over an entire length of the peripheral edge portion with said molding material.

11. An apparatus according to claim 5, wherein said multilayer glass panel is horizontally placed on said first worktable;

said first worktable is capable of moving said multilayer glass panel placed thereon in a direction along a plane of said multilayer glass panel; and said first coating mechanism comprises:

a first Y-axis slide movable over said multilayer glass panel on said first worktable in directions along the direction in which said multilayer glass panel is movable;

a first X-axis slide movably mounted on said first Y-axis slide and movable in a horizontal plane on and along said first Y-axis slide in directions which are perpendicular to the directions in which said first Y-axis slide is movable;

a first Z-axis slide movably mounted on said first X-axis slide and movable in a vertical plane on and along said first X-axis slide in directions which are perpendicular to the directions in which said first X-axis slide is movable and the directions in which said first Y-axis slide is movable; and a first coating gun rotatably mounted on said first Z-axis slide and rotatable about a vertical Z-axis of said first Z-axis slide, for coating the peripheral edge portion of said one surface of the multilayer glass panel over an entire length of the peripheral edge portion with said molding material.

12. An apparatus according to claim 4, wherein said multilayer glass panel is horizontally placed on said second worktable;

said second worktable is capable of moving said multilayer glass panel placed thereon in a direction along a plane of said multilayer glass panel; and said second coating mechanism comprises:

a second Y-axis slide movable over said multilayer glass panel on said second worktable in directions along the direction in which said multilayer glass panel is movable;

a second X-axis slide movably mounted on said second Y-axis slide and movable in a horizontal plane on and along said second Y-axis slide in directions which are perpendicular to the directions in which said second Y-axis slide is movable;

a second Z-axis slide movably mounted on said second X-axis slide and movable in a vertical plane on and along said second X-axis slide in directions which are perpendicular to the directions in which said second X-axis slide is movable and the directions in which said second Y-axis slide is movable; and a second coating gun rotatably mounted on said second Z-axis slide and rotatable about a vertical Z-axis of said second Z-axis slide, for coating the peripheral edge portion of said other surface of the multilayer glass panel over an entire length of the peripheral edge portion with said molding material.

13. An apparatus according to claim 5, wherein said multilayer glass panel is horizontally placed on said second worktable;

said second worktable is capable of moving said multilayer glass panel placed thereon in a direction along a plane of said multilayer glass panel; and said second coating mechanism comprises:

a second Y-axis slide movable over said multilayer glass panel on said second worktable in directions along the direction in which said multilayer glass panel is movable;

a second X-axis slide movably mounted on said second Y-axis slide and movable in a horizontal plane on and along said second Y-axis slide in directions which are perpendicular to the directions in which said second Y-axis slide is movable;

a second Z-axis slide movably mounted on said second X-axis slide and movable in a vertical plane on and along said second X-axis slide in directions which are perpendicular to the directions in which said second X-axis slide is movable and the directions in which said second Y-axis slide is movable; and a second coating gun rotatably mounted on said second Z-axis slide and rotatable about a vertical Z-axis of said second Z-axis slide, for coating the peripheral edge portion of said other surface of the multilayer glass panel over an entire length of the peripheral edge portion with said molding material.

14. An apparatus according to claim 6, wherein said multilayer glass panel is horizontally placed on said second worktable;

said second worktable is capable of moving said multilayer glass panel placed thereon in a direction along a plane of said multilayer glass panel; and said second coating mechanism comprises:

a second Y-axis slide movable over said multilayer glass panel on said second worktable in directions along the direction in which said multilayer glass panel is movable;

a second X-axis slide movably mounted on said second Y-axis slide and movable in a horizontal plane on and along said second Y-axis slide in directions which are perpendicular to the directions in which said second Y-axis slide is movable;

a second Z-axis slide movably mounted on said second X-axis slide and movable in a vertical plane on and along said second X-axis slide in directions which are perpendicular to the directions in which said second X-axis slide is movable and the directions in which said second Y-axis slide is movable; and a second coating gun rotatably mounted on said second Z-axis slide and rotatable about a vertical Z-axis of said second Z-axis slide, for coating the peripheral edge portion of said other surface of the multilayer glass panel over an entire length of the peripheral edge portion with said molding material.

\* \* \* \* \*